United States Patent [19]

Middleton

[11] Patent Number: 5,137,460
[45] Date of Patent: Aug. 11, 1992

[54] DESKTOP KIT AND METHOD FOR DEMONSTRATING CARPET CLEANING PRINCIPLES

[75] Inventor: Ernest W. Middleton, Racine, Wis.
[73] Assignee: Racine Industries, Inc., Racine, Wis.
[21] Appl. No.: 590,777
[22] Filed: Oct. 1, 1990
[51] Int. Cl.⁵ ............................................. G09B 25/00
[52] U.S. Cl. .................. 434/365; 206/45.14; 206/579
[58] Field of Search ................. 434/365–370, 434/382, 429; 206/45.14, 45.34, 579, 438, 528; 220/529, 554

[56] References Cited

U.S. PATENT DOCUMENTS

| | | | |
|---|---|---|---|
| 1,296,158 | 3/1919 | Bonham | 206/45.14 |
| 2,184,406 | 12/1939 | Troxler . | |
| 2,672,980 | 3/1954 | Halbach | 206/528 |
| 2,745,195 | 5/1956 | Gombert . | |
| 3,973,335 | 8/1976 | Price . | |
| 4,396,121 | 8/1983 | Lemmon . | |
| 4,772,207 | 9/1988 | LaFontsee et al. . | |

Primary Examiner—Richard J. Apley
Assistant Examiner—Glenn E. Richman
Attorney, Agent, or Firm—Jansson & Shupe Ltd.

[57] ABSTRACT

A portable desktop kit for demonstrating principles relating to carpet care includes a carrying case divided into a first compartment and a second compartment by a barrier. At least one tube is slidably secured by the barrier for representing an erect strand of carpet in a demonstration position. The first compartment is divided to at least two carrying cavities, one of the cavities being sized to receive the tube when the kit is arranged for carrying. The first compartment also contains demonstrating means for describing the construction of carpet while the second compartment contains means for soiling a portion of the tube for demonstration purposes. The second compartment also contains means for cleansing the soil from the tube. Methods for using the kit are also disclosed.

12 Claims, 4 Drawing Sheets

DESKTOP KIT AND METHOD FOR DEMONSTRATING CARPET CLEANING PRINCIPLES

FIELD OF THE INVENTION

This invention is related generally to visual demonstrations of principles relating to carpet care and, more particularly, to methods and means for demonstrating construction of carpets and for cleaning carpets.

BACKGROUND OF THE INVENTION

Understanding carpet construction, how carpet becomes soiled, and particularly how carpet releases soil is essential to proper carpet care. Developing a thorough understanding of such carpet-care principles forms the basis for successful carpet maintenance planning and often dictates the choice of a specific carpet-cleaning method. The benefits are substantially improved carpet appearance, substantially extended carpet life, and cost-effective carpet maintenance.

On the other hand, a failure to appreciate such carpet-cleaning principles often results in an unreasonable use of discredited carpet-cleaning techniques, particularly wet carpet-cleaning techniques. This, in turn, leads to a number of readily avoidable carpet-maintenance problems. Such problems may be immediately severe and expensive, particularly when occurring on major new carpet installations, or at least will be harmful to the appearance and useful life of the carpet.

Broadly stated, the problems of such wet carpet cleaning techniques involve the retention of too much dirt on and in the carpet, the accumulation of dirt and other residues deep in the carpet, and the damage that water and cleaning solutions can cause. The damage to carpets from wet cleaning methods, in addition to those related to the retention of dirt and solution residues, can include shrinkage, seam splitting, delamination, the formation of mildew and mold, rotting, dye bleeding, dulling, and other discoloration.

Thus, the importance of gaining a clear understanding of carpet construction and conveying such carpet-care principles to the persons responsible for carpet care can readily be appreciated. It is to these ends that this invention is directed and it will be better understood after a brief discussion of certain carpet-care principles.

Carpet includes a pile made up of generally vertically oriented strands of yarns which are attached to a carpet backing. The yarns are made up of many small thin fibers which are twisted together in some fashion. Carpets may have a loop pile or a cut pile, but in either case both the yarns and individual fibers themselves are generally vertically oriented The carpet backing usually includes a primary backing and a secondary backing, the details of which need not be described here. Most carpet soil consists of very small particles, the median particle size being on the order of about 2 microns while a typical carpet fiber to which such particle adheres is on the order of about 40 microns in diameter. The relative size of a typical adhering particle of carpet dirt is so small compared to the size of a single carpet fiber that beside the particle, the fiber surface appears nearly flat.

Most carpet soil is applied by foot traffic. While loose particles typically form about 85% of carpet soil, about 10% of carpet soil is oily. Most soil adheres to the top portion of the pile, primarily to the top one-third of the pile.

Loose carpet soil which may accumulate in the carpet pile is removable by vacuuming, and aggressive vacuuming can even loosen some of the soil adhering to carpet fibers. However, soil which resists vacuuming continues to build up on the carpet fibers and as it builds up, the oily or sticky components tend to increase the rate which soil build-up occurs.

Carpet soil which has adhered to carpet fibers and cannot be removed by vacuuming requires loosening by contact with chemical cleaning agents and brushing. Virtually all carpet cleaning methods bring chemical cleaning agents, usually including water, in contact with the dirt adhering to carpet fibers in order to loosen it. However, the different ways in which this is accomplished have a very great effect on how well carpet is cleaned. While soil loosening is important, removal of the soil from the carpet is the objective.

The many different "wet" carpet cleaning methods, i.e., methods in which a free (flowable) liquid is applied to the carpet in any fashion, loosen the dirt but lose control of it in the process. The dirt is dispersed into the liquid, but only a portion of such dirty liquid is then removed. It is well known that no more than about 80% (and often less) of the free liquid applied to a carpet is removable. Therefore, the dirt and cleaning agents in the remaining liquid remain in the carpet as a residue on carpet fibers, on the carpet backing, and down in the carpet backing.

In contrast, a dry extraction carpet-cleaning method, brings chemical cleaning agents into contact with the dirt adhering to carpet fibers without using free liquid. Many tiny damp particles, made damp with specific carpet cleaning chemicals, are applied to the carpet and brushed through the carpet in a particular manner. The chemical content of the particles loosens the soil adhering to the carpet fibers, and the soil adheres to the particles much in the same way that dirt adheres to a damp sponge after wiping a dirty surface. Indeed, the particle composition, when brushed through the carpet pile, is like millions of tiny sponges scrubbing the carpet fibers.

After the brushing step, the particles are vacuumed from the carpet. The particles are sufficiently large that vacuuming removes the great majority of the particle composition, carrying the dirt and chemical content with it. The particle sizes are also sufficiently large that the particles remain above the carpet backing in position allowing removal by such vacuuming. Thus, such dry extraction carpet-cleaning method provides a high level of control in the dirt-loosening and removing steps—a substantial advantage over wet carpet-cleaning methods. Using this dry extraction method, many of the problems associated with wet cleaning are avoided.

In recent years, an increased awareness has developed within the carpet industry of both the severe disadvantages of wet carpet-cleaning methods and the important advantages of a dry extraction carpet-cleaning method. Such awareness is greatest among those engaged in carpet manufacturing and marketing, where the risks of improper carpet maintenance are often the greatest. Many mills have come to specifically recommend a dry extraction method.

The cleaning industry has not been as quick to appreciate the strong advantages of the dry extraction carpet-cleaning method, and much wet carpet cleaning continues, with all its disadvantages and risks. Some who have an interest in continuing to supply chemicals and machines for old-style wet carpet cleaning have even pooled their resources in a effort to reverse the carpet industry trend toward the dry extraction method.

Those engaged in or concerned with carpet maintenance require technically accurate information regarding carpet care. If they can grasp such information quickly, they will retain it and it will affect their carpet-cleaning decisions.

Various means have been used to demonstrate certain points about carpet cleaning and carpet cleaning methods. Dirt has been dispersed in water and displayed, flat dirt-covered members have been sprayed or wiped to illustrate some of the disadvantages/advantages mentioned above, and the same sort of test has been performed using upright cylinders on a flat base.

There is a clear need for improved methods and means to demonstrate principles relating to carpet care. In particular, there is a need for an improved kit which lends itself to use with a smaller audience of one or a few persons and in a smaller area, such as a desktop, which visually demonstrates the ways in which carpets are constructed and which further demonstrates methods, both discredited and favored, for cleaning carpets.

OBJECTS OF THE INVENTION

It is an object of this invention to provide a kit and method for its use which overcomes some of the problems and shortcomings of the prior art.

Another object of this invention is to provide a kit which may be used in a small desktop area to instruct a limited audience of a few persons.

Yet another object of this invention is to provide a kit having yarn and carpet components for demonstrating the steps in constructing a carpet.

Still another object of this invention is to provide a demonstration method employing dirt samples and cleaning components for demonstrating discredited and favored methods of cleaning carpets.

Another object of this invention is to provide a kit which is light and easily transported while yet permitting a demonstration method which has a high degree of visual impact upon the audience.

How these and other objects are accomplished will become apparent from the descriptions of this invention which follow.

SUMMARY OF THE INVENTION

In general, a portable desktop kit for demonstrating principles relating to carpet care includes a carrying case divided into a first compartment and a second compartment by a barrier. At least one tube is slidably secured by the barrier for representing an erect strand of carpet in a demonstration position. The first compartment is divided to at least two carrying cavities, one of the cavities being sized to receive the tube when the kit is arranged for carrying. The first compartment also contains demonstrating means for describing the construction of carpet while the second compartment contains means for soiling a portion of the tube for demonstration purposes. The second compartment also contains means for cleansing the soil from the shaft portion.

The carrying case is preferably embodied as a lower, relatively deep tub and an upper, shallow cover, both formed of a slightly resilient plastic material and each having a lip which may be brought to sealing engagement with a respective side of the barrier. When assembled for carrying, the tub, the barrier and the cover fasten together to retain the demonstration components therewithin.

In a highly preferred embodiment, a plurality of tubes is slidably secured by the barrier for representing erect strands of carpet. Preferably, the contents of the first compartment will include a plurality of sample segments of carpet, a sample segment of greige goods, a simulated floor tile sample and a length of rope. The segments, sample and rope are positionally retained in the first compartment by a divider when the kit is arranged for carrying. The first compartment will also contain at least one empty vial.

In a preferred embodiment, the second compartment will contain sample strands of carpet yarn, a plurality of vials of differing materials for demonstrating principles relating to carpet care such as sandy grit, dirt, dry extraction cleaning granules, a sponge simulator and a container of cleaning liquid. For demonstration purposes, this liquid may be water. Optionally, the second compartment may also include fiber resin colorant pellets and a vial of mud.

By the use of a divider, the first compartment may be apportioned to at least two cavities, one of which is an outer peripheral cavity for receiving the carpet segments, the greige goods and the length of rope. By retaining these components around the outer periphery of the carrying case tub, the central cavity will be made available to receive the tubes when the kit is arranged for carrying.

Similarly, the components to be received and carried in the cover may be arranged therein around the periphery when the cover is inverted upon a supporting surface such as a desktop. When the components are so arranged, a central pocket will be defined for receiving the proximal ends of the shafts when the barrier is placed to engage the cover and the kit assembled for carrying.

When the kit is arranged for demonstration, the cover with the barrier still engaged therewith is removed by lifting upward and then is inverted upon a desktop. Thereafter, the barrier containing the tubes is removed from the cover and the tubes are urged outwardly to a position where their proximal ends are approximately flush with the ... e of the barrier. When placed on a desktop with the tubes extending upward, the barrier represents the carpet base or backing while the tubes represent strands of carpet fiber. It is to be appreciated that the barrier may be removed from the cover and the tubes arranged in their upwardly extending position either before or after the demonstration of carpet construction as described following.

By sequential removal of the components from the compartments, carpet construction can be demonstrated. In particular, the strands of yarn may be removed to demonstrate how fibers may be used in either a staple (cut) form or continuous form to construct cut pile or loop pile carpets, respectively. The sample of greige goods may then be removed and described to be exemplary of a preliminary stage in carpet manufacture where the fibers are not yet dyed. In this stage, the stiff carpet backing has yet to be applied, usually by use of a water based adhesive. The segment of finished carpet may be withdrawn next and this segment may be of a type colored by vat or topical dying or, much less commonly, may be colored by using strands of synthetic yarn where the colorant has been added thereto and has become a part of the fiber. This segment may then be used to explain the construction of finished carpet with relatively stiff, adhesive-applied backing and dense, upwardly-extending strands.

As a next step, the demonstrator may withdraw the floor tile sample from the first compartment and place it aside the segment of finished carpet. Small quantities of sandy grit are then placed upon each surface to demonstrate that such grit will remain on the surface of the tile and is easily visible thereon. In contrast, the grit may be readily made to disappear into the carpet segment simply by stroking the segment across its top surface. This illustrates that carpets hide soil and the cleaning thereof must be approached with a methodology dramatically different from that used to clean hard tile.

While not essential to the kit, the visual impact of the demonstration will be increased if the kit is equipped with a length of rope. This rope may then be withdrawn from the first compartment and will preferably be made of nylon or some other synthetic fiber to more closely resemble a carpet. As described in greater detail following, this rope may be used to demonstrate the bundling of smaller fibers and to further demonstrate that the dirt-collecting surface area in a carpet is very much greater than that of a hard tile for an equivalent floor area.

Optionally, the first compartment may also include a demonstration device, such as may be made by E. I. DuPont Company. Such a device includes rigid plastic representations of clear round fibers, delustered round fibers, tri-lobal fibers and quad-lobal fibers, the latter having small axial holes therethrough. The purpose of this device is to illustrate how the construction of the fiber itself may be selected to hide the presence of dirt.

DEMONSTRATION OF SOIL REMOVAL CAPABILITIES OF CLEANING METHODS

While this demonstration may be carried on with a single tube, it is preferable to use at least two tubes to avoid the necessity of re-preparing it for the second part of the demonstration. Wet dirt is applied near the distal ends of the tubes and different cleaning steps representative of wet carpet cleaning methods on the one hand and a dry extraction carpet cleaning method on the other hand are then executed with respect to the dirty tubes.

Following, a demonstration may be made of the advantages of a dry extraction cleaning method by rubbing a damp wiping member, such as a damp sponge simulator on the dirty surface of the other dirty tube. Dirt is transferred to the sponge without the presence of flowing liquid, which may otherwise be destructive of carpet backing and cause delamination or other undesirable results.

In a preferred method of this invention, the demonstration kit may be used to show both the lack of control of dirt in wet carpet cleaning and the controlled dirt removal of the aforementioned dry extraction carpet cleaning method. Such demonstrations uses a tube, preferably a light-colored opaque vertical member, positioned in the erect position, with its proximal end generally flush with the plane of the barrier.

Either before or after such tube positioning, dirt is applied onto the outer surface of the tube at positions therealong near the distal end such that the dirt adheres to the tube. The dirt is preferably dried onto the tube. Then a cleaning step representative of one type of carpet-cleaning method is executed with respect to such dirty tube. The demonstration is repeated using another dirty tube and another cleaning step, representing another carpet-cleaning method.

One such cleaning step includes applying free liquid onto the dirty tube, allowing the liquid to loosen the dirt from the tube such that the liquid becomes visibly dirty, and allowing such dirty liquid to flow under the force of gravity farther down the tube and to the barrier, thus illustrating that free liquid applied to a carpet moves dirt farther down into the carpet and into the carpet backing.

Another form of cleaning step involves rubbing a damp wiping member, preferably a block-shaped wiper such as a damp sponge simulator, on the dirty tube such that dirt is released from the tube and adheres to the wiping member without the presence of flowing liquid. Such damp wiping member and all the dirt adhering thereto is then removed from the tube and away from the entire kit. Such sponge or other damp wiping member represents one tiny damp particle of a particle composition used in the dry extraction carpet cleaning method.

In this cleaning demonstration, using a sponge or other wiping member, it is plain that the dirt removal from the carpet fibers and yarns is controlled and that removal of the dirt entirely away from the carpet is highly controlled as well. In a particularly preferred form of this cleaning demonstration, the sponge or other wiping member, after it removes dirt from the tube, is placed atop the barrier adjacent a tube. Then, the dirtied wiping member may be blown off easily, which demonstrates the easy removal of dirt and composition by vacuuming using the dry extraction method.

Many other demonstrations may be performed using the demonstration kit of this invention. These will be described in greater detail hereafter.

DETAILED DESCRIPTIONS OF PREFERRED EMBODIMENTS

The figures illustrate a portable desktop kit 10 for demonstrating principles relating to carpet care.

Figure 1:
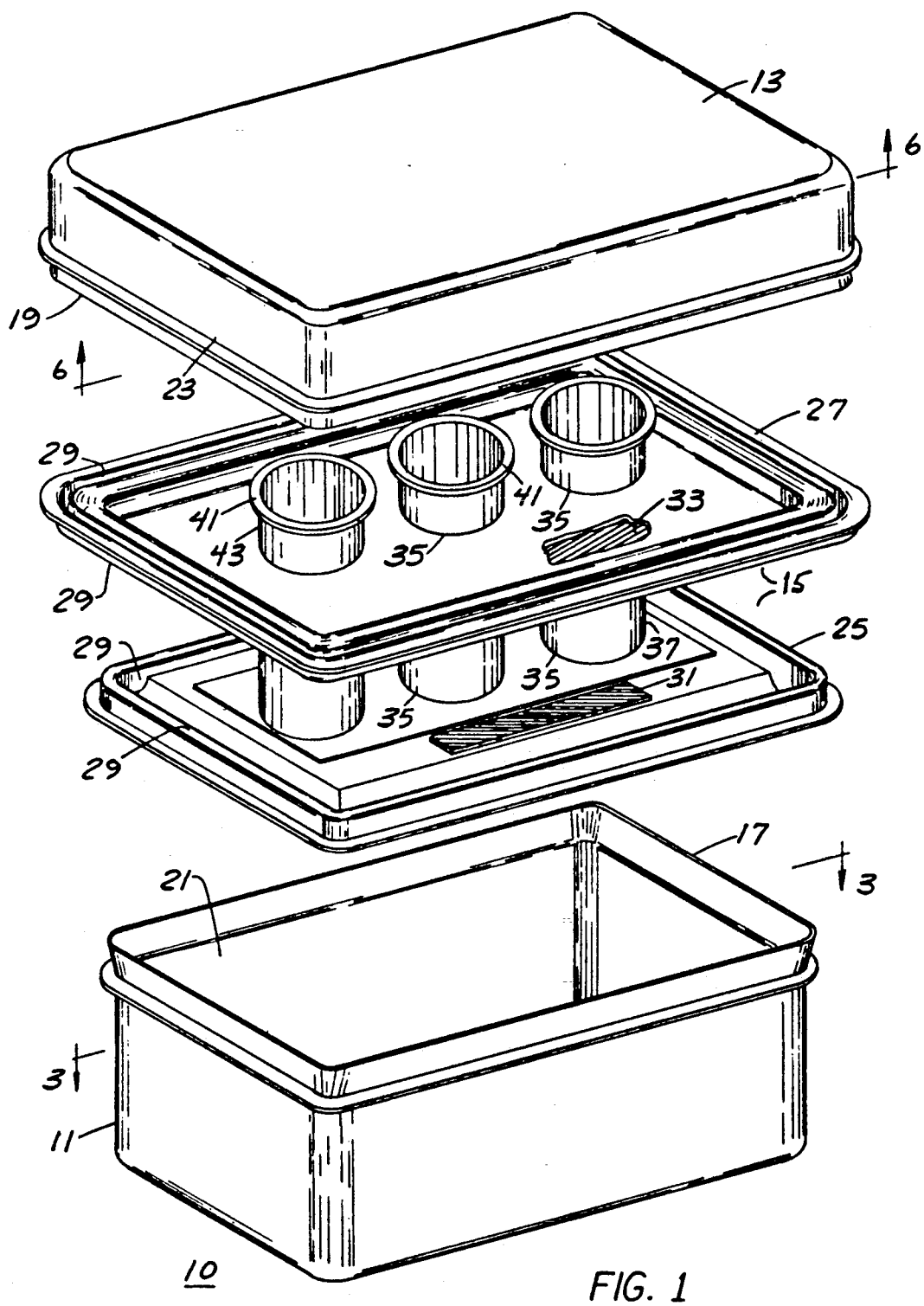
FIG. 1 is an exploded perspective view of the demonstration kit of this invention with parts removed.

Referring to FIG. 1, the kit 10 includes a carrying case having a lower tub 11, an upper cover 13 and a composite, generally planar barrier 15. The barrier 15 is retained in engagement along the peripheral edges 17, 19 of the tub 11 and the cover 13 respectively, thereby dividing the case into a first lower compartment 21 and a second upper compartment 23. The composite barrier 15 includes a first barrier panel 25 for defining one wall of the lower compartment 21 and a second barrier panel 27 for defining one wall of the upper compartment 23. The interfacing surfaces of the panels 25, 27 are configured in a peripheral continuous tongue and groove 29, such as is commonly found in plastic food containers. This construction causes the panels 25, 27 to be maintained attached to one another and to the tub 11 and cover 13 when pressed together. To further secure the panels 25, 27 to one another, a first pair of Velcro® strips 31 (one not shown) may be affixed to the interfacing surface of the panels 25. Gripping Velcro strips 33 (one not shown) may be affixed to the interfacing surface of the other panel 27 in registry with the first pair of strips 31 and the strips 31, 33 will adhere to one another when the panels 25, 27 are pressed together.

A suitable tub 11, cover 13 and composite barrier panels 25, 27 are available from Rubbermaid Inc. The composite barrier 15 includes at least one aperture 35 formed therethrough, and preferably a plurality of apertures 35, each aperture 35 being sized for positionally retaining a tube 37 slidably received therein. As will be described in greater detail following, the tube(s) 37 represent erect strands of carpet when in the demonstration position.

Figure 2:
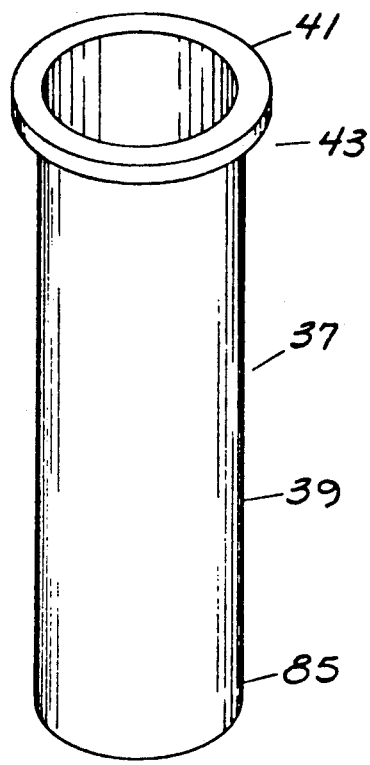
FIG. 2 is a perspective view of one of the tubes shown in FIG. 1.

Referring additionally to FIG. 2, each tube 37 is shown to include a generally cylindrical barrel 39 and an engagement lip 41 at the proximal end 43 for preventing the tube 37 from inadvertently passing through the barrier 15 as the tubes 37 are placed in demonstration position. The lip 41 is sized to have a diameter slightly greater than that of the related aperture 35. The tube 37 and the aperture 35 are cooperatively sized so that the tube 37 will slide rather readily therethrough, but will be retained in a position by friction. While the tube 37 may be of solid construction, in a preferred embodiment, it will be hollow for lighter weight. It is also preferred that the tube 37 be rigid and of a light or white exterior color to better visually illustrate the application of dirt as will be described following. The length of the tube 37 is to be selected to be somewhat less than the total interior height defined by the tub 11 and cover 13 so that the cover 13, barrier 15 and tub 11 may be easily assembled for carrying without interference.

Figure 5:
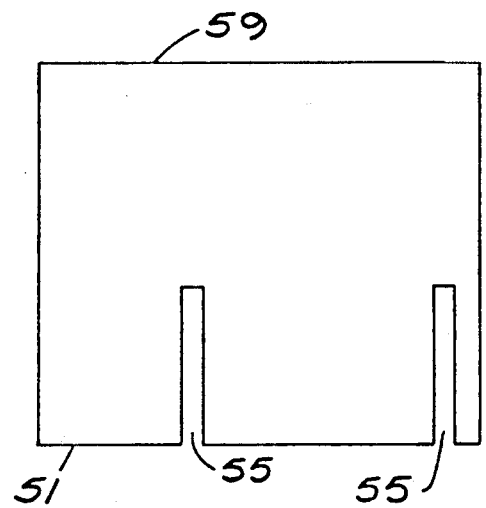
FIG. 5 is a side elevation view of a short divider panel shown in FIG. 3.
Figure 4:
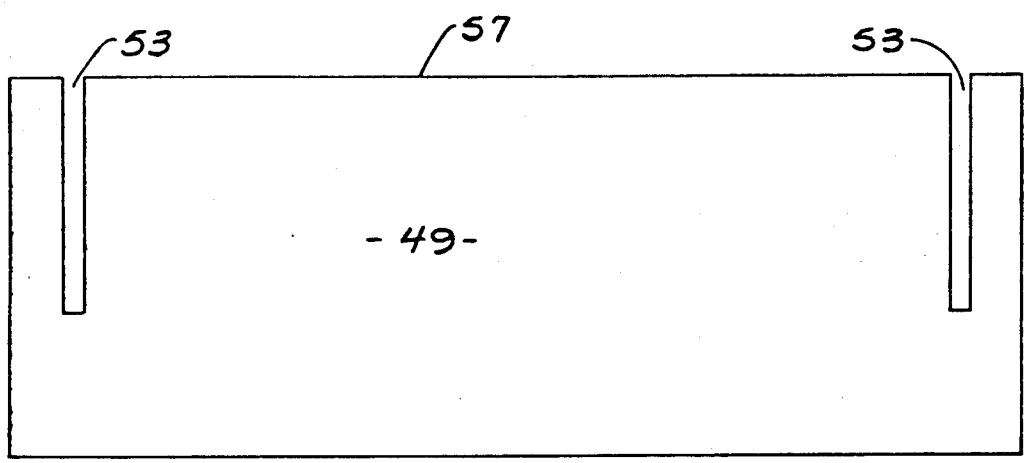
FIG. 4 is a side elevation view of a long divider panel shown in FIG. 3.
Figure 3:
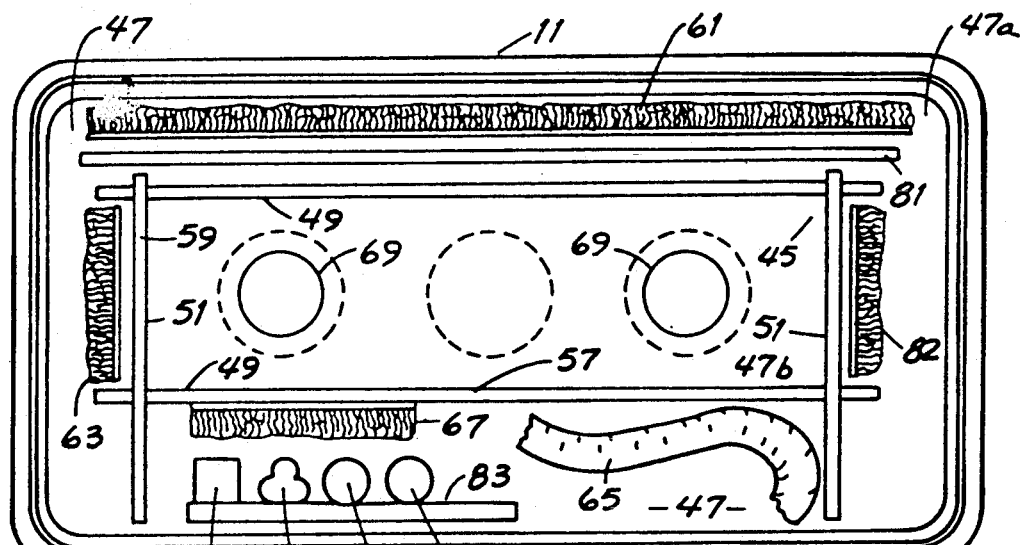
FIG. 3 is a top plan view of the lower tub of the kit taken along the view 3—3 of FIG. 1 with divider panels installed, with items used in demonstration shown placed therein in the carrying position and with the position of the tubes shown in dotted outline.

Referring next FIGS. 3, 4 and 5, the first compartment 21 receives divider means 45 for defining a plurality of cavities 47 within the first compartment 21. In a preferred embodiment, the divider means 45 includes a pair of long divider panels 49 and a pair of short divider panels 51. The panels 49, 51 may be formed of a flat, rigid material such as ABS plastic. Each long divider panel 49 is formed to include a pair of upward-opening interlock notches 53, each notch 53 being generally adjacent to end of the panel 49. Similarly, each short divider panel 51 includes a pair of downwardly-opening interlock notches 55, the depth of the notches 53, 55 being selected so that the upper edges 57 of the long divider panels 49 are generally flush with the upper edges 59 of the short divider panels 51 when the panels 49, 51 are installed in the tub 11 and interlocked as shown in FIG. 3.

The length of the long divider panels 49 is preferably selected to be substantially equal to the longitudinal interior dimension and the interior height of the tub 11. The height of the short divider panels 51 is preferably selected to be equal to that of the long divider panels 49.

The length of the short divider panels 51 and the cooperative spacing of the notches 53, 55, both longitudinally and laterally, are selected to provide a first cavity 47a for receiving a sample segment of tufted carpet 61 which is substantially equal in length to the interior longitudinal dimension of the tub 11.

Other cavities 47 so formed by the interlocking panels 49, 51 will receive another segment of tufted carpet tile 63, a length of rope 65 and a segment of greige goods 67. The configuration of the panels 49, 51 is further selected such that a central cavity 47b is formed in the tub 11 for receiving the downwardly-projecting ends of the tubes 37 when the kit 10 is arranged for carrying. In the carrying mode, the empty vials 69 for water and dirt may be positioned within the tubes 37 as shown in FIG. 3. In the preferred embodiment of the kit 10, the collection of demonstration items contained in the cavities 47, 47a will also include a floor tile sample 81, a carpet tile sample 82 and a carpet fiber shape demonstrator 83.

Figure 6:
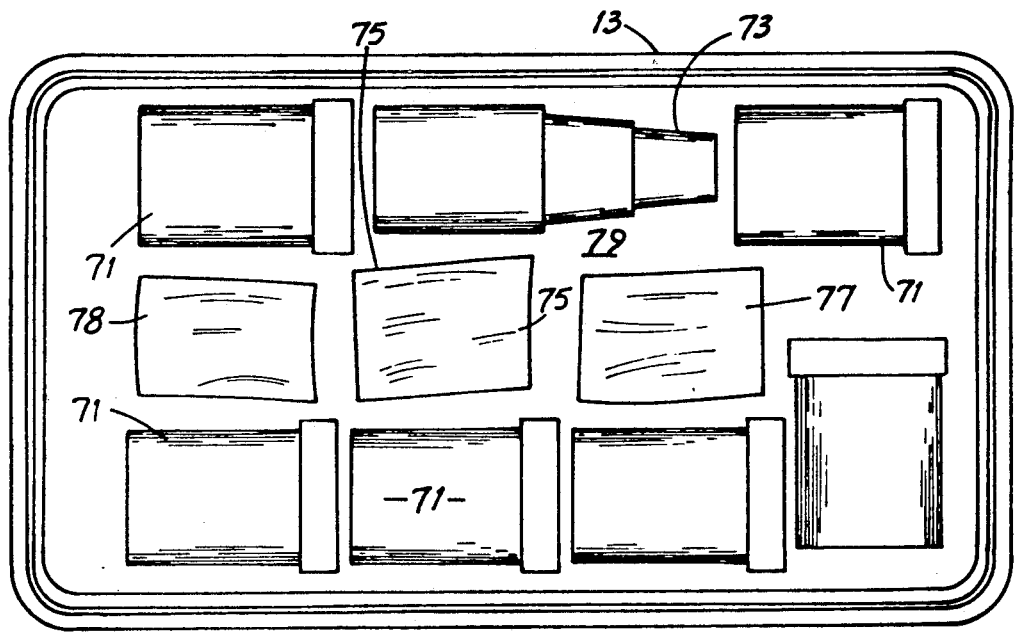
FIG. 6 is a plan view of the inverted cover of the kit taken along the view 6—6 of FIG. 1 and with items used in demonstration shown placed therein in the carrying position; and, FIG. 7 is a perspective view of the tube and barrier components of the invention shown in a position for demonstration.

Referring next to FIG. 6 and in a highly preferred embodiment, the cover 13 is shown to contain, in carrying position and in any order, a plurality of vials 71 containing, respectively, dirt, mud, a dry wiping member such as a sponge simulator, sandy grit, solvent-moistened carpet cleaning granules and such granules from which the solvent has been allowed to evaporate. HOST® Dry Carpet Cleaning granules are available from Racine Industries, Inc., Racine, Wis. Also received in the cover 13 is a small container 73 of cleaning solution which, for demonstration purposes, may be water preferably in a pump spray container. In addition, the cover 13 may contain three small transparent plastic bags 75, 77, 78 containing, respectively, samples of uncolored pellets, fibers and carpet yarns, samples of colored pellets, fibers and carpet yarn and samples of yarn plies. When describing the construction of carpet, some demonstrators elect to display colored or uncolored pellets which may be used during the manufacture of synthetic carpet fiber.

For carrying, the vials 71 and the container 73 are arranged in any order about the inner periphery of the cover 13 to define a central pocket 79 for receiving the substantially flat bags 75, 77, 78 and the ends of the tubes 37 when the kit 10 is assembled for carrying. From the foregoing, it is to be appreciated that the tubes 37 may be inserted through the apertures 35 in the barrier 15 in such a fashion that during carrying, their proximal ends 43 are received either in the pocket 79 of the cover 13 or in the cavity 47b of the tub 11.

It is to be appreciated that the foregoing description of the location of the contents of the tub 11 and cover 13 is not critical and is intended to illustrate only one of several possible arrangements.

KIT SET UP

Referring to FIGS. 1, 3, 6 and 7, the kit 10 is converted from a carrying mode to a demonstration mode by removing, as a unit, the cover 13 and the composite barrier 15 from the tub 11. During removal, the cover 13 and barrier 15 should be maintained in engagement with one another to prevent inadvertent dropping of the items lodged in the cover 13. Following removal, the cover 13 is inverted and placed upon a desktop or other surface with the tubes 37 protruding upward. Thereupon, the barrier 15 and its retained tubes 37 are removed from the cover and the tubes 37 urged from their proximal end 43 to a position whereby the lip 41 engages the barrier 15.

Figure 7:
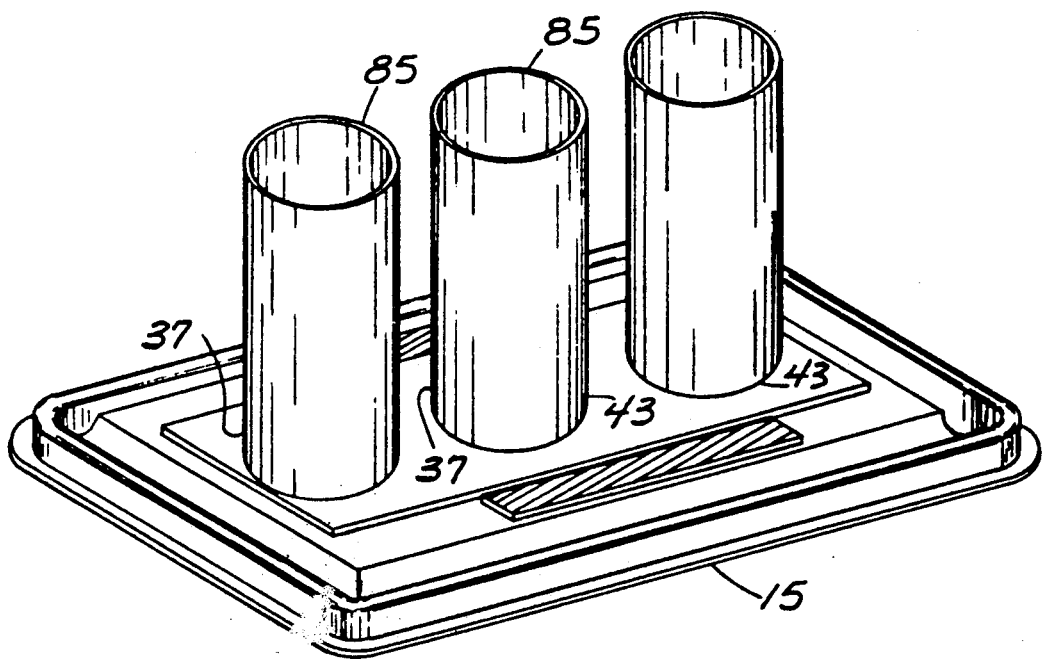

The barrier 15 is then placed upon a desktop or other surface with the proximal ends 43 of the tubes 37 downward and the distal ends 85 of the tubes 37 upwardly-erect for demonstration purposes. When placed in such position as shown in FIG. 7, the barrier 15 represents the carpet backing and the tubes 37 represent erect strands of carpet. The samples of carpet 61, 63, the rope 65, the greige goods 67, the vials 69, the floor tile sample 81, the carpet tile sample 82, the demonstrator 83, the vials 71, the container 73 and the bags 75, 77, 78 are then removed from the compartments 21, 23 and arranged on the surface used to conduct the demonstration.

DEMONSTRATION OF CARPET CONSTRUCTION

The yarn strands contained in bags 75, 77, 78 and the rope 65 are displayed while describing the construction of cut pile and loop pile carpet, respectively. Some demonstrators prefer to also describe how the synthetically-colored fibers are manufactured by displaying clear and colored fiber resin pellets in bags 75,77. The fiber shape demonstrator 83 may also be used to describe how the shape of carpet fiber has evolved.

In the next step, an intermediate construction phase may be demonstrated by withdrawing and displaying the segment of greige goods 67 which is embodied as carpet fibers attached to a thin backing. Unless these fibers were formed with homogeneous colorant during their manufacture, a less common circumstance, they will exhibit a natural color.

In a next step, the segment of finished carpet 61 and carpet tile 63 are displayed while describing how the greige goods 67 may be mounted to the final backing with a water based, water soluble adhesive which may be softened or destroyed by discredited wet carpet cleaning methods.

DEMONSTRATION OF SOILING CHARACTERISTICS

Following, the floor tile 81 is removed from the cavity 47a and placed beside the segment of the carpet 61, thereby displaying a floor covering which has soiling and cleaning characteristics which are in sharp contrast to those of carpet. For example, the floor tile 81 has a hard horizontal surface, has no depth to be cleaned and readily displays dirt. In contrast, the soiled portions of the carpet 61, the surfaces of the erect strands, are vertical and the carpet 61 must be cleaned to a depth. A dramatic demonstration of these differing characteristics is accomplished by pouring a small quantity of sandy grit or dry dirt on the surface of the floor tile 81 and upon the carpet 61. It will be apparent that the grit remains on the surface of the tile 81 and is readily visible and easily removed. In contrast, a slight horizontal brushing of the surface of the carpet 61 will cause the dirt to disappear, leading one to incorrectly conclude that the carpet 61 is clean.

It is known that of the soil which collects on carpet fibers, approximately 85–90% thereof is dry dirt and about 10–15% thereof is oily residue. It is further known that virtually all of the soil which collects on carpet fibers is lodged upon the upper one-third of the fiber length.

To further illustrate soiling characteristics, the length of rope 65 may be removed from the tub 11 and one of its ends brushed or fanned to expose the fibers. This visually illustrates, in greatly enlarged fashion, the large number of individual fibers required to make a carpet fiber strand of relatively small diameter It also demonstrates that the total strand surface area which may become soiled in a carpet is very much greater than the surface area which can become soiled in a hard tile floor covering for equivalent covered areas. In fact, it has been estimated that the strand surface area in a 30 oz. carpet results in about 800 times the surface area as would be presented by a hard floor tile.

The kit 10 may optionally include a small demonstrator device for showing how fiber shapes can affect the visual perception of dirt being present on a carpet. In such a demonstrator device 83, available from E. I. DuPont, a round clear plastic rod 87, a round delustered plastic rod 89, a tri-lobal plastic rod 91 and quadlobal rod 93 with hollow filament representations are used to demonstrate that each strand shape, as represented by the rods 87, 89, 91, 93, differs in its ability to conceal dirt. The point of the demonstration is that with improved fiber design, carpets may, in fact, be more soiled than they appear.

DEMONSTRATION OF EFFECT OF CLEANING METHODS

A pair of demonstrations may be carried out in an improved manner with preferred demonstration kit 10 of this invention. These demonstrations explain the controlled dirt-removal advantages of a dry extraction carpet-cleaning method and the substantial problems and disadvantages of widely used wet carpet-cleaning methods.

Referring to FIGS. 1 and 7, each of the demonstrations may be carried out using only a single vertical tube 37, but they are most preferably carried out using plural, opaque vertical tubes. It is most preferred that at least two such tubes 37 be used because there are two separate demonstrations which should be performed in sequence.

In these demonstrations, wet dirt is applied, preferably rather heavily, onto two tubes 37 at positions therealong near their distal ends 85. Such wet dirt is then allowed to dry and as it adheres to the outside surfaces of the opaque tubes 37 it will be readily visible against the light surfaces of such opaque tubes 37. It is preferred that approximately the top one-third of such tubes 37a, 37b be heavily covered with dirt, since this represents the portion of carpet yarns and fibers on which foot-applied dirt which is unremovable by vacuuming normally adheres.

When the tubes 37a, 37b are in erect position, as represented by the illustration of FIG. 7, all or most of the dirt applied thereto is well above the barrier 15.

Different cleaning steps, representative of wet carpet cleaning methods on the one hand and a dry extraction carpet cleaning method on the other hand, are then executed with respect to such dirtied tubes 37.

DEMONSTRATION OF SEVER PROBLEMS OF WET CARPET-CLEANING METHODS

A common characteristic of the many widely used wet carpet cleaning methods is the application of free liquid onto the carpet. That is, liquid in a flowable form is applied to the carpet for the purpose of loosening carpet soil adhering to pile yarns and fibers. Such free liquid, which is usually water with detergents and other carpet-cleaning chemicals, is applied to carpets in a variety of ways. The exact application method does not change the fact that free flowing liquid comes in contact with the carpet. To heightened the visual impact of the adverse effect of free flowing dirty liquid on carpet strands, a vial of dirty water may be prepared, shakened and displayed during this portion of the demonstration.

In this demonstration, free liquid is applied onto one of the dirty tubes 37, preferably by heavily spraying the dirtiest top portion of such tube 37 with water from container 73. After such liquid application, the liquid will loosen some of the dirt from the tube 37. Under the force of gravity, such dirty liquid will flow down the tube 37. Such downward flow of dirty liquid continues until the dirty liquid reaches the carpet backing as represented by the barrier 15. In an actual carpet, the backing would likely be penetrated, resulting at least in the migration of dirt to nearly inaccessible parts of the carpet and very possibly in softening or separation of the backing.

This flowing action clearly transports dirt onto the cleaner lower portions of the tube 37, near the proximal end 43, and such dirty water flow can easily be seen against the light opaque tube. It becomes quite apparent that while the dirt or a good portion of the dirt has been loosened from the top portion of the tube 37, much of it has flowed farther down the tube 37.

This demonstrates the loss of control of dirt using wet carpet-cleaning methods and when it is explained that much of such dirty and chemical-laden water will dry in place, it becomes apparent that a substantial amount of such dirt will remain on and in the carpet. It becomes apparent that the main effects of wet carpet cleaning methods are: loosening of top dirt to give a temporary clean look; relocation of a substantial portion of such top dirt to a lower position with all the problems which that brings; and movement of liquid into the carpet backing, which is known to carry risks of mildewing, rotting, seam splitting, delamination, shrinkage, wood rot, and other problems.

Yet another disadvantage of wet carpet cleaning methods relates to the phenomenon of "wicking" i.e., dissolved soil which has settled at the base of the fibers and upon the carpet backing will be drawn up the vertical surfaces of the fibers during evaporation of the liquid. While the dirt remains on the fibers, it has been upwardly relocated, often in such a manner that soil spots which were apparently removed are returned and again become visible.

DEMONSTRATION OF DIRT TRANSFER BY WET CLEANING METHODS

Still another demonstration may be made using a prepared vial of dirty water. The length of rope 65, preferably light colored or white, can be repeatedly dipped into such dirty water and with each dip, such rope 65 will become quite apparently dirtier.

The rope 65 represents a carpet yarn, particularly an individual tuft, which is from an area of the carpet less soiled than other parts. It can be seen that the dirty liquid created from the more-soiled portions of the carpet will, using certain wet cleaning methods, be made to migrate to relatively clean tufts. This has a visually obvious deleterious effect on the appearance of the tuft and of the carpet.

DEMONSTRATION OF ADVANTAGES OF A DRY EXTRACTION CLEANING METHOD

The controlled dirt-removal advantages of a dry extraction carpet-cleaning method are demonstrated by rubbing a damp wiping member, such as a moistened sponge taken from one of the vials 71, on the dirty surface of the other dirty tube 37. Such wiping action causes the dirt to be removed from the tube 37 and to adhere to the sponge and such dirt transfer is accomplished without the presence of flowing liquid. The amount of moisture in the sponge is well less than an amount which would cause release of flowing liquid by the rubbing action described.

Such sponge represents one tiny damp particle of a particle composition for cleaning carpets. More specifically, such sponge is representative of one particle of the dry extraction carpet cleaning composition sold under the trademark HOST® by Racine Industries, Inc., of Racine, Wis. The actual form in which the composition occurs may be demonstrated by removing from the cover 13 the vial 71 which contains dry cleaning granules and displaying it to the viewer.

The sponge is preferably a light-colored or white sponge such that the dirt removed from the tube 37 by the rubbing action is plainly apparent to the eye.

After the rubbing step by which dirt is transferred from the tube 37 onto the sponge, such sponge may be placed loosely on top of the upper surface of the barrier 15, representing the carpet backing, to illustrate that particles of such HOST® particle composition, after they have been repeatedly rubbed against carpet yarns and fibers and have removed the dirt therefrom, will settle no farther into the carpet than a position above the top of the carpet backing. They will not move down into the carpet backing.

As the sponge rests on the top of the barrier, it may readily be blown off. This illustrates the ease with which such particles may be removed from the carpet by vacuuming. Indeed, each of the characteristics of this demonstration illustrate the controlled removal of carpet dirt from carpet fibers from the loosening and removal of dirt from the fibers and yarns to the complete physical removal from the carpet of the particles bearing the dirt.

The inventive kit 10 may be varied in many different ways without departing from the essence of the invention. For example, the opaque tubes 37 may have an opaque surface coating or may be made of an opaque plastic such as polyvinyl chloride. Other ways of varying the kit include changing the number of vertical tubes 37, modifying the length of such tubes 37 or changing the shape of the tub 11 and cover 13 or changing the arrangement of the items lodged therein, to name just a few.

While the principles of the inventive kit and method have been described in connection with specific embodiments, it should be appreciated that these descriptions are made only by way of example and are not intended to limit the scope of the invention.

What is claimed:

1. A portable, desktop kit for demonstrating principles relating to carpet car comprising:
   a carrying case divided to a first compartment and a second compartment by a barrier;
   at least one tube slidably retained by the barrier in a demonstration position or in an alternate position for carrying;

the first compartment being divided to at least two cavities, one of which is sized to receive the tube when the kit is arranged for carrying;

the compartments containing demonstrating means for describing the construction of carpet;

the second compartment containing means for soiling a portion of the tube and means for cleansing the soil from the portion.

2. The kit of claim 1 wherein said demonstrating means includes at least one sample segment of carpet and at least one sample strand of carpet yarn of a first type.

3. The kit of claim 2 wherein said demonstrating means further includes a sample segment of greige goods and a sample strand of carpet yarn of a second type.

4. The kit of claim 1 including plural tubes extending from the barrier into one of the cavities of the first compartment for kit carrying and extending upward from the barrier during demonstration.

5. The kit of claim 4 wherein the barrier is inverted from its carrying position when preparing the kit for demonstration.

6. A portable desktop kit for demonstrating principles relating to carpet care comprising:

a carrying case divided to a first compartment and a second compartment by a barrier;

a plurality of tubes slidably retained by the barrier for representing erect strands of carpet in demonstration position;

the first compartment including divider means for defining a plurality of cavities therewithin, such cavities collectively containing a plurality of sample segments of carpet, a sample segment of greige goods and a length of rope, the segments and the rope being positionally retained in the first compartment by the divider means when the kit is arranged for carrying;

the second compartment containing a plurality of vials of differing materials for demonstrating principles relating to carpet care.

7. The kit of claim 6 wherein said second compartment further contains a sponge and a container of cleaning liquid; the tubes each include a first portion and a second portion and the vials, the sponge and the container are disposed about the periphery of the second compartment to define a pocket for receiving the first portion of the tubes when the kit is arranged for carrying.

8. The kit of claim 7 wherein one of said cavities within the first compartment receives the second portion of the tubes when the kit is arranged for carrying.

9. The kit of claim 8 wherein said tubes are formed of an opaque light-colored material.

10. The kit of claim 6 wherein said materials include sandy grit, dirt cleaning granules, a sponge and a cleaning liquid.

11. A portable, desktop kit for demonstrating principles relating to carpet care comprising:

a carrying case having a tub, a cover and a barrier retained along opposed edges of the tub and the cover, thereby dividing the case to a first compartment and a second compartment;

the barrier having a plurality of apertures formed therethrough and sized for slidably securing a tube received therein;

a separate tube inserted through each of the apertures for representing erect strands of carpet in demonstration position;

the first compartment containing plural samples for demonstrating the construction of carpet;

the second compartment containing means for soiling the tubes and means for cleansing the soil from the tubes;

each of the tubes having a proximal end with a radially projecting lip for engaging the barrier and preventing the tube from becoming inadvertently separated from the barrier when the tube is in demonstration position.

12. The kit of claim 11 wherein said tubes are formed of an opaque, light-colored rigid material.

* * * * *

UNITED STATES PATENT AND TRADEMARK OFFICE
CERTIFICATE OF CORRECTION

PATENT NO. : 5,137,460

DATED : August 11, 1992

INVENTOR(S) : Ernest W. Middleton

It is certified that error appears in the above-identified patent and that said Letters Patent is hereby corrected as shown below:

Column 1, line 54 after "oriented" insert --.--.

Column 1, line 57 the sentence starting with "Most" should be a new paragraph.

Column 12, line 63 delete "car" and insert --care--.

Signed and Sealed this

Seventh Day of September, 1993

*Attest:*

*Attesting Officer*

BRUCE LEHMAN

Commissioner of Patents and Trademarks